United States Patent
Koestler et al.

(10) Patent No.: US 8,825,273 B2
(45) Date of Patent: Sep. 2, 2014

(54) METHOD FOR MONITORING A PEDESTRIAN DETECTING DEVICE FOR A VEHICLE

(71) Applicant: Bayerische Motoren Werke Aktiengesellschaft, Munich (DE)

(72) Inventors: Ulrich Koestler, Hebertshausen (DE); Wilhelm Riedl, Pfaffenhofen (DE); Gerhard Fichtinger, Grasbrunn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/711,343

(22) Filed: Dec. 11, 2012

(65) Prior Publication Data
US 2013/0103251 A1    Apr. 25, 2013

Related U.S. Application Data

(63) Continuation of application No. PCT/EP2011/061510, filed on Jul. 7, 2011.

(30) Foreign Application Priority Data

Jul. 21, 2010   (DE) .................. 10 2010 031 599

(51) Int. Cl.
*G06F 17/00*    (2006.01)

(52) U.S. Cl.
USPC ................. 701/30.8; 701/29.7; 701/30.5

(58) Field of Classification Search
USPC ........... 701/29.1, 29.7, 30.5, 30.8, 30.9, 31.1, 701/32.2, 29.2, 33.4, 45; 180/274; 296/187
See application file for complete search history.

(56) References Cited

U.S. PATENT DOCUMENTS

| | | | | |
|---|---|---|---|---|
| 4,638,289 A | * | 1/1987 | Zottnik | 246/45 |
| 4,864,202 A | | 9/1989 | Nitschke et al. | |
| 5,375,056 A | * | 12/1994 | Nitschke et al. | 701/30.8 |
| 5,617,337 A | * | 4/1997 | Eidler et al. | 702/104 |

(Continued)

FOREIGN PATENT DOCUMENTS

| | | |
|---|---|---|
| DE | 36 39 065 A1 | 5/1988 |
| DE | 43 35 700 A1 | 4/1995 |

(Continued)

OTHER PUBLICATIONS

International Search Report dated Oct. 5, 2011 including English-language translation (Six (6) pages).

(Continued)

*Primary Examiner* — Calvin Cheung
*Assistant Examiner* — Lail Kleinman
(74) *Attorney, Agent, or Firm* — Crowell & Moring LLP

(57) ABSTRACT

A method is provided for monitoring a pedestrian detecting device for a vehicle, wherein an absorber is provided on a bumper of the vehicle. The absorber can deform in the event of a collision with a pedestrian. The deformation is transferred to a connecting element, and the connecting element actuates a sensor that generates a sensor signal. The functionality of the pedestrian detecting device can be monitored by saving the current sensor signal as a target value every time the vehicle is parked, and saving the current sensor signal as an actual value every time the vehicle is restarted. The actual value is compared to the target value, and a deviation of the target value from the actual value is detected and/or displayed.

13 Claims, 1 Drawing Sheet

(56) References Cited

U.S. PATENT DOCUMENTS

| | | | |
|---|---|---|---|
| 7,103,460 B1* | 9/2006 | Breed | 701/32.9 |
| 7,631,565 B2 | 12/2009 | Tanabe | |
| 2006/0144667 A1* | 7/2006 | Schweizer et al. | 192/84.1 |
| 2006/0232052 A1* | 10/2006 | Breed | 280/735 |
| 2008/0082237 A1* | 4/2008 | Breed | 701/45 |
| 2009/0132117 A1* | 5/2009 | Kondoh et al. | 701/36 |
| 2009/0150030 A1* | 6/2009 | Kobayashi | 701/45 |

FOREIGN PATENT DOCUMENTS

| | | |
|---|---|---|
| DE | 197 18 803 C1 | 10/1998 |
| DE | 20 2004 005 434 U1 | 8/2004 |
| DE | 10 2005 011 389 A1 | 12/2005 |
| DE | 102005011389 * 12/2005 | B60R 21/34 |
| DE | 10 2006 051 749 A1 | 5/2007 |
| DE | 10 2005 011 389 B4 | 2/2008 |
| DE | 10 2007 048 988 A1 | 6/2008 |
| DE | 60 2005 003 955 T2 | 12/2008 |
| DE | 10 2008 025 466 A1 | 1/2009 |
| WO | WO 2004/071824 A1 | 8/2004 |
| WO | WO 2007/066064 A1 | 6/2007 |

OTHER PUBLICATIONS

German Search Report dated Oct. 14, 2010 including partial English-language translation (Nine (9) pages).

* cited by examiner

METHOD FOR MONITORING A PEDESTRIAN DETECTING DEVICE FOR A VEHICLE

CROSS REFERENCE TO RELATED APPLICATIONS

This application is a continuation of PCT International Application No. PCT/EP2011/061510, filed Jul. 7, 2011, which claims priority under 35 U.S.C. §119 from German Patent Application No. DE 10 2010 031 599.0, filed Jul. 21, 2010, the entire disclosures of which are herein expressly incorporated by reference.

BACKGROUND AND SUMMARY OF THE INVENTION

The present invention relates to a method of monitoring a pedestrian detecting device for a vehicle, wherein an absorber is provided on a bumper of the vehicle, which absorber can deform in the event of a collision with a pedestrian. The deformation is transmitted to a connecting element, and the connecting element actuates a sensor which generates a sensor signal.

A pedestrian detecting device for a vehicle is known, for example, from German Patent Document 10 2005 011 389 B4. When the bumper of a vehicle collides with a pedestrian, the bumper will be imparted and subjected to a load which deforms the bumper. This deformation is transmitted to a connecting element which actuates a sensor. The signal of this sensor can be analyzed and can be used for initiating corresponding protective measures which can reduce injury to the pedestrian.

When the vehicle is parked, a deformation of the bumper can, for example, be caused by an impact, which deformation may impair the pedestrian detecting device in its function, preventing the latter from operating properly.

There is therefore needed a method by which the operating efficiency of a pedestrian detecting device can be monitored.

According to the invention, this and other needs are met by a method of monitoring the functionality of a pedestrian detecting device for a vehicle, wherein an absorber is provided on a bumper of the vehicle, which absorber can deform in the event of a collision with a pedestrian. The deformation is transmitted to a connecting element, and the connecting element actuates a sensor which generates a sensor signal. A current sensor signal is stored as a target value every time the vehicle is parked. The current sensor signal is stored as the actual value every time the vehicle is restarted. The actual value is compared with the target value, and a deviation of the target value from the actual value is indicated.

As a result of these process steps, it becomes possible to recognize whether a deformation of the bumper has taken place during the time the vehicle was parked. On the basis of this information, the vehicle can then, for example, be checked in a service shop with respect to the functionality of the pedestrian detecting device and, if required, a repair measure can be initiated. A permanent functionality of the pedestrian detecting device is thereby ensured.

According to an advantageous embodiment, the target value and the actual value, respectively, are detected when the ignition is switched off or on. An essentially automated detection of the values therefore takes place without requiring the driver to do anything.

In order to, for example, be able to compensate temperature differences or intentional changes at the bumper, such as a change of the rigidity of the bumper by markings of different lengths, a calibration of the actual and/or target value can take place during the drive and/or when the vehicle is parked. Influences that may impair the fault recognition and are caused by the temperature and/or by changes can therefore be eliminated when the functionality of the pedestrian detecting device is checked.

Advantageously, a deviation of the actual value from the target value is indicated to the deriver visually and/or acoustically. As a result of this indication or display, the driver can then visit a service shop for checking the pedestrian detecting device.

As an alternative or in addition, a deviation of the actual value from the target value can also be stored in the fault memory of the vehicle, where it can then be read out in the service shop.

The sensor is preferably accommodated close to the outer skin of the vehicle (for example, in the interior area of a front bumper) in order to ensure an early signal detection.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
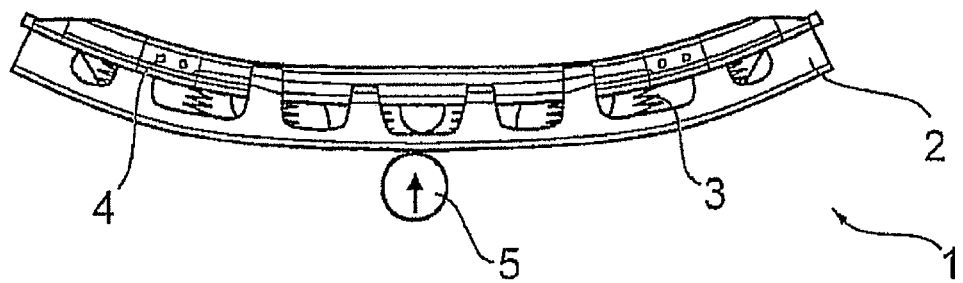
FIG. 1 is a schematic illustration of a bumper of a motor vehicle being impacted during a parking maneuver in order to illustrate an exemplary method according to the invention.
Figure 2:
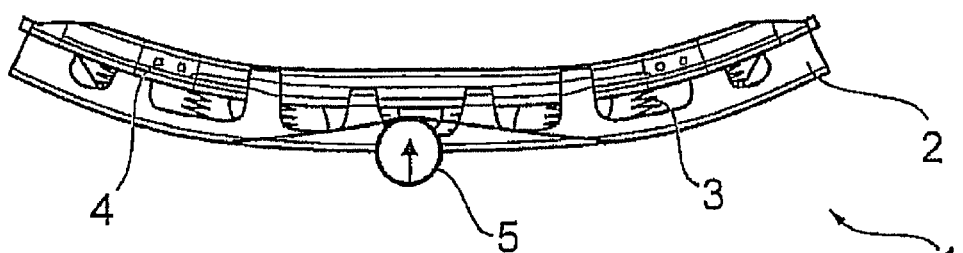
FIG. 2 is a schematic illustration of the bumper in FIG. 1 wherein an absorber has been deformed due to the impact.
Figure 3:
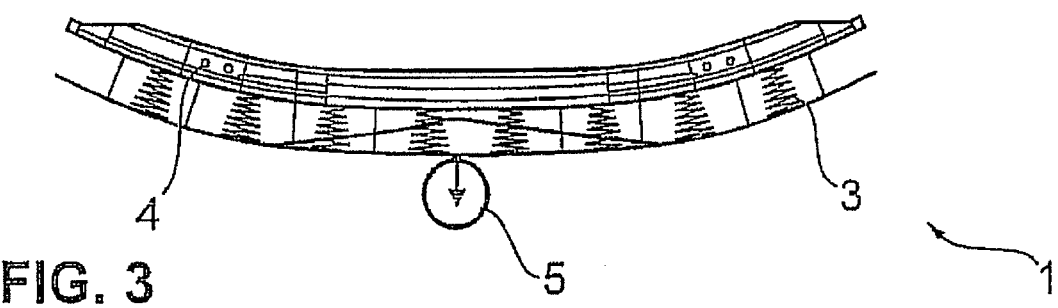
FIG. 3 illustrates the bumper of FIG. 1 after the impact has occurred.

In FIGS. 1 to 3, the method according to the invention will be explained in connection with an impact on a bumper 1 during a parking maneuver of a vehicle (not shown).

The bumper 1 includes an absorber 2, a connecting element 3 and a sensor 4. In the present case, the absorber 2 may consist of sheet metal or of foam. The connecting element 3 is formed of spring elements. The sensor 4 is constructed as a sensor bar. The sensor 4 may be arranged directly at the absorber 2. As an alternative, the sensor may be arranged on the outer skin, as, for example, the bumper covering.

When the vehicle is, for example, parked in a parking lot, the driver will normally switch off the ignition. Upon this occurring, the current sensor signal of the sensor 4 is stored as a target value.

FIG. 1 illustrates an impact on the bumper 1 of a parked vehicle caused during a parking maneuver, for example, by a trailer coupling device, such as a trailer hitch. In this case, the trailer coupling device 5 deforms the absorber 2, as illustrated in FIG. 2. This deformation causes a permanent deformation of the absorber 2, which deformation will also remain when the trailer coupling device no longer acts upon the absorber 2, as illustrated in FIG. 3. However, because of the continuous deformation of the absorber 2, the sensor 4 continues to be acted upon by pressure, whereby the sensor signal is changed.

So that, even in the case of relatively slight impacts during parking maneuvers, a reliable signal generation for the sensor is ensured, the sensor can be fastened in a prestressed manner. This would ensure a reliable generating of a signal even in the case of almost negligible or not visible impacts during parking. It is particularly advantageous for the sensor to be arranged close to or on the outer skin of the vehicle, for example, in the interior of a front bumper, because this would ensure an early, fast and reliable detection of an impact that occurs during a parking maneuver.

When the ignition is now actuated in the case of the vehicle impacted during the parking maneuver, the current sensor signal will be stored as the actual value and will be compared with the target value determined during the parking of the vehicle. If the two signals differ from one another, an acoustic and/or visual indication will be triggered, which signals to the driver that an impact occurred during the parking maneuver. The driver or owner of the vehicle can then have the pedestrian detecting device checked in a service shop for its functionality. As an alternative or in addition, the result of the comparison of the target value and the actual value can also be stored in a fault memory of the vehicle, and checked during a routine service visit.

When the target value and the actual value correspond to one another, no indication will take place because a proper functionality of the pedestrian detecting device can be assumed in such a case.

In order to be able to compensate temperature-related influences and/or intentional changes on the bumper 1, such as a change of the rigidity of the bumper 1 as a result of markings of different lengths, a calibration of the actual value and/or target value can take place during the drive and/or when the vehicle is parked.

LIST OF REFERENCE NUMBERS

1 Bumper
2 Absorber
3 Connecting Element
4 Sensor
5 Trailer Coupling The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of monitoring functionality of a pedestrian detecting device for a vehicle, the method comprising the acts of:
    generating, by a sensor operatively coupled to the pedestrian detecting device, sensor signals indicative of a current operating condition of the pedestrian detecting device of the vehicle;
    storing, in a memory of the vehicle as a target value, a first sensor signal that is generated by the sensor upon the vehicle being parked;
    storing, in the memory of the vehicle as an actual value, a second sensor signal that is generated at a point in time after the vehicle has been parked and when the vehicle is restarted;
    comparing, the actual value with the target value to determine any deviation of the actual value from the target value resulting from an impact while the vehicle has been parked; and
    determining, the functionality of the pedestrian detecting device as a function of the comparison, wherein the pedestrian detecting device comprises an absorber on a bumper of the vehicle, the absorber being deformable in an event of a collision with a pedestrian, wherein deformation due to the collision is transmitted to a connecting element that actuates the sensor to generate the sensor signal.

2. The method according to claim 1, wherein the storing of the target value occurs when an ignition of the vehicle is switched off, and the storing of the actual value occurs when the ignition of the vehicle is switched on.

3. The method according to claim 1, further comprising the act of: calibrating at least one of the actual value and the target value during a drive of the vehicle.

4. The method according to claim 2, further comprising the act of: calibrating at least one of the actual value and the target value during a drive of the vehicle.

5. The method according to claim 1, further comprising the act of: calibrating at least one of the actual value and the target value when the vehicle is parked.

6. The method according to claim 2, further comprising the act of: calibrating at least one of the actual value and the target value when the vehicle is parked.

7. The method according to claim 1, further comprising the act of: indicating, to an operator, at least one of visually and acoustically, when there is a deviation of the actual value from the target value.

8. The method according to claim 2, further comprising the act of: indicating, to an operator, at least one of visually and acoustically, when there is a deviation of the actual value from the target value.

9. The method according to claim 1, further comprising the act of: storing, in a fault memory of the vehicle, a deviation of the actual value from the target value.

10. The method according to claim 2, further comprising the act of: storing, in a fault memory of the vehicle, a deviation of the actual value from the target value.

11. The method according to claim 7, further comprising the act of: storing, in a fault memory of the vehicle, a deviation of the actual value from the target value.

12. A method of monitoring functionality of a pedestrian detecting device for a vehicle, the method comprising the acts of:
    generating, by a sensor operatively coupled to the pedestrian detecting device, sensor signals indicative of a current operating condition of the pedestrian detecting device of the vehicle;
    storing, in a memory of the vehicle as a target value, a first sensor signal that is generated by the sensor upon the vehicle being parked;
    storing, in the memory of the vehicle as an actual value, a second sensor signal that is generated at a point in time after the vehicle has been parked and when the vehicle is restarted; and
    determining a deviation between the actual value and the target value, resulting from an impact while the vehicle has been parked, indicates a potential change in the functionality of the pedestrian detecting device, wherein the pedestrian detecting device comprises an absorber on a bumper of the vehicle, the absorber being deformable in an event of a collision with a pedestrian, wherein deformation due to the collision is transmitted to a connecting element that actuates the sensor to generate the sensor signal.

13. A system for monitoring functionality of a pedestrian detecting device for a vehicle, the system comprising:
    a pedestrian detecting device;
    a sensor operatively coupled to the pedestrian detecting device, wherein the sensor is configured to generate sensor signals indicative of a current operating condition of the pedestrian detecting device, wherein the sensor is configured to provide, as a target value, a first sensor signal that is generated by the sensor upon the vehicle being parked, and wherein the sensor is further configured to provide, as an actual value, a second sensor signal that is generated at a point in time after the vehicle has been parked and when the vehicle is restarted, and wherein a deviation between the actual value and the target value, resulting from an impact while the vehicle has been parked, indicates to a potential change in the functionality of the pedestrian detecting device.

\* \* \* \* \*